May 6, 1941.　　　　O. MORGENSEN, JR　　　2,240,512
WHEEL CHOCK
Filed July 10, 1940
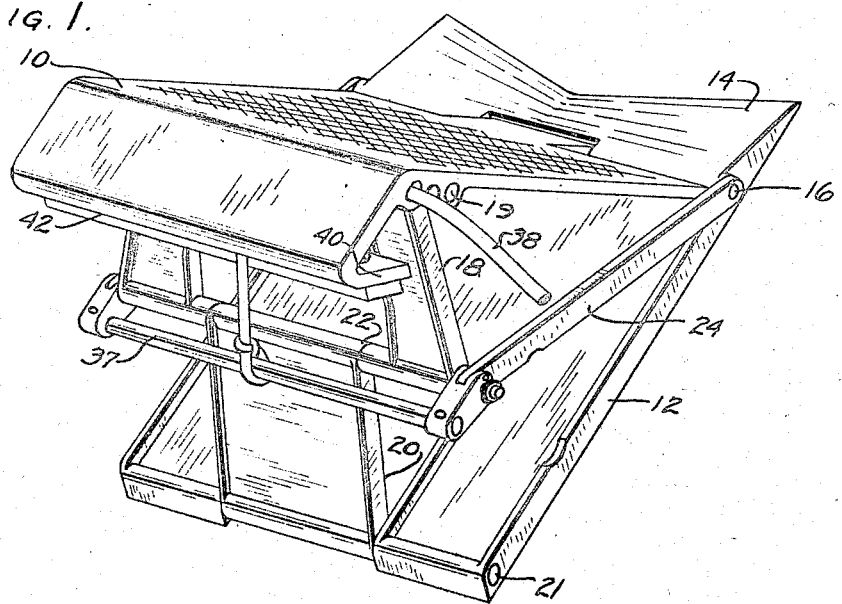
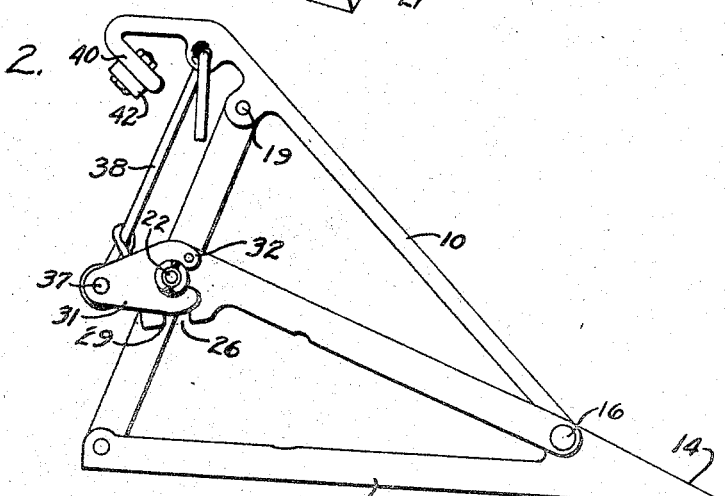
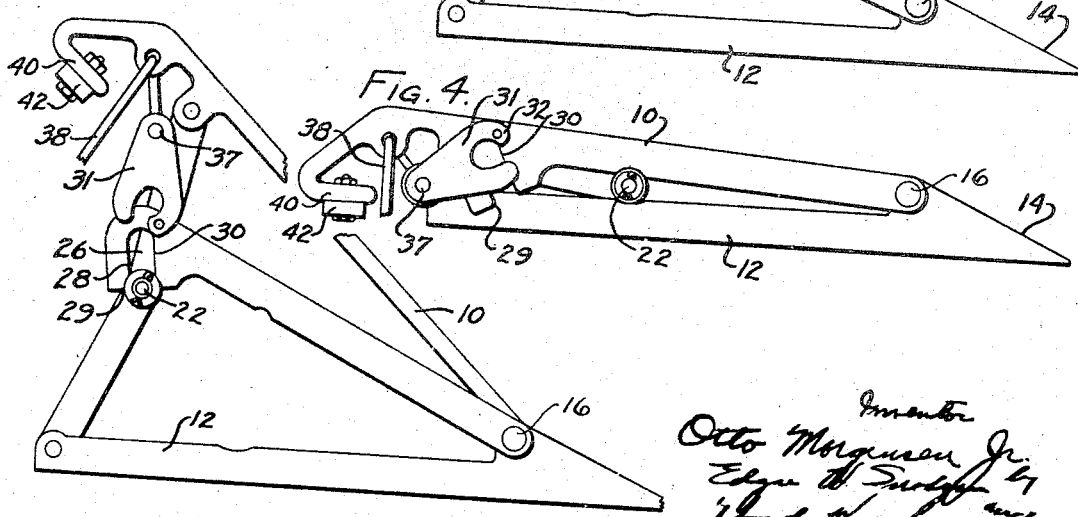

Patented May 6, 1941

2,240,512

UNITED STATES PATENT OFFICE 2,240,512

WHEEL CHOCK

Otto Morgensen, Jr., Dayton, Ohio

Application July 10, 1940, Serial No. 344,754

7 Claims. (Cl. 188—32)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to wheel chocks such as used for blocking the wheels of airplanes or other vehicles.

It becomes a considerable problem to provide a satisfactory wheel chock for an airplane when used on soft or muddy terrain. The conventional type wooden block wheel chocks partially sink into the soft ground. At the same time, the aircraft takes a more forward position on the chock thus imposing a greater load on the chock. These two conditions operate jointly to make the chock very difficult to remove. To overcome this difficulty, I have provided a chock that may be collapsed when it is no longer needed and allow the wheels to pass over same eliminating the necessity for removing the chock. I have novelly constructed the chock so that it is easy to collapse and the energy required to collapse same remains negligible regardless of the weight or mass of the aircraft bearing on the chock. It is a further advantage of my invention that the chock requires less space in storage, or for transporting, because of its collapsibility. Still another advantage of my invention is that the chock may be collapsed by manipulation from a point remote from the wheel, thereby providing greater safety for the mechanic or attendant by making it unnecessary for him to go near the vicinity of the propeller, or within the path of the aircraft as it starts to move after being released from the restraining action of the chock.

It is also a consideration of this invention to provide a means for releasably locking the collapsible members of the chock in the operative or extended position.

It is another object of this invention to provide a means for initiating the collapsing action of the chock.

It will be appreciated from the foregoing remarks that my invention contemplates broadly a novel means for releasably supporting a load wherein the releasing member may be operated with a minimum force regardless of the weight of the mass.

Further objects and advantages of my invention will be obvious from the following detailed description and the drawing appended hereto, wherein like reference numerals indicate like parts throughout the several views.

Figure 1 is a perspective view showing the chock in extended or open position.

Figure 2 is a side elevation of the chock in extended position.

Figure 3 is a side elevation similar to Figure 2 but showing the chock with latch and brace member lifted and collapsing action initiated.

Figure 4 is a side elevation view showing the chock in collapsed position.

Referring to the drawing, it will be seen that the chock as illustrated comprises a member 10 for engaging the vehicle wheel (not shown), an earth engaging or base member 12 having an apron 14 forming a substantial continuation of the member 10, and a collapsible toggle link arrangement connecting the wheel-engaging member and base member at the rear part of the chock. The wheel-engaging member and base member are pivotally connected at the front or apex 16 of the chock, considered as a triangular structure. The link arrangement in the opened or operative position may then be regarded as constituting the base of the triangular structure. The link arrangement comprises a member 18 pivotally connected to the wheel-engaging member at 19, a member 20 pivotally connected to the base member at 21, and the two link members 18 and 20 are pivotally connected to each other on a journal 22.

In order to secure the link members in the extended position, which constitutes the operating position of the chock, there is provided on each side a brace member 24 pivotally connected to either the wheel-engaging member or the base member at the apex journal 16 and having notch 26 arranged to engage the pivot journal 22 in close fitting relation. When the brace member is thus engaged, as shown in Figure 2, the chock becomes a rigid structure and functions as though it were a solid body. The notch 26 in the brace is located so that the pivot journal 22 will be held on substantially a straight line connecting pivot 19 with pivot 21 thus enabling the link members 18 and 20 to take the force transmitted by the wheel-engaging member 10 substantially in compression. The notch 26 is constructed with its sides 28 and 30 preferably parallel, side 28 having the open end 29 on a shorter radius from the apex journal 16 than the closed end so that it acts as a cam, upon upward, or releasing, movement of the brace 24, requiring but a very small force to break the dead center compression force, or to swing the pivot journal 22 from a position to the left of the dead center position, across dead center, and in the direction of collapsing, and thus initiate collapsing of the members 18 and 20, as shown in Figure 3, regardless of the load or force on said member during compression.

If there is any deviation of the pivot journal 22 as held in the notch 26, from the straight line connection between points 19 and 21, it is preferably toward the front or apex of the chock and to the right of the dead center. Thus, the dead center position of the link members is broken, in the extended position of the chock, in the direction of collapsing, so that the load on the chock will exert a force on the side 30 of notch 26 and act as a cam in raising the brace member 24, disengaging same from the pivot journal 22.

In order to secure the brace member 24 against disengagement under load when the pivot journal 22 is engaged by notch 26 in a position to the right of the dead center, or to prevent any inadvertent disengagement of the brace, there is provided for each brace a latch member 31 in the form of a hook pivotally connected to the brace at point 32. The hook of the latch member is so constructed and the point of attachment to the brace member is such, with respect to the pivot journal 22, that an upwardly directed or releasing force on the brace member will cause the hook to rotate in a direction, when it is in engagement with the pivot journal 22, to more positively engage said pivot journal 22 and hold all the tighter.

The latch members on each brace are connected by means of a bar 37 which serves to cause the latches and braces to operate in unison, and is attached to the latches so as to act as a weight to automatically cause the latches to fall into the position of engagement with pivot journal 22. To the bar 37 is fastened a small rope or cord 38 which is threaded through apertures located in the wheel-engaging member of the chock. The rope extends for a sufficient length to enable collapsing of the chock from a point out of the path of the wheel, and more particularly when used with bimotored aircraft, from a point beyond the radius of the propeller, since the wheels of bimotored planes are frequently directly behind the propellers. A pull on the rope disengages the latches, releases the braces and, in releasing the braces, initiates collapsing action, if necessary, of the link members 18 and 20 by the camming action of side 28 of the notch on pivot 22. The weight or force supported by the chock then concludes the collapsing action and the chock assumes the position shown in Figure 4. In this position, the wheel can easily pass over the chock, particularly since the chock will be partially submerged in the earth under the conditions of its primarily intended use.

The wheel-engaging member 10 is preferably provided with a flat plate portion 40 at its upper end which is angularly disposed so as to present its area to the earth in the collapsed position as shown in Figure 4. The said portion also forms with the member 10 a recess in which is located the apertures for receiving the releasing cord, and thus serves to protect them from mud and earthen objects. In the event the chock is to be used on a concrete or other hard surface runway, there may be further provided, as illustrated, a resilient cushion pad 42 preferably of rubber attached to the bottom side of portion 40 so as to break the fall of the chock on collapsing, thus reducing shock on both the chock and the runway surface.

It is to be understood that the foregoing description is illustrative only and that modifications and variations of the invention may be made, the invention being limited only by the scope of the appended claims.

I claim:

1. A collapsible wheel chock comprising a wheel-engaging member and a base member, with one end of each pivotally connected together, a pair of link members pivotally connected to said first-mentioned members at the other ends thereof and to each other to enable collapsing and extending of said first-mentioned members, a brace member pivotally connected to one of said first-mentioned members and readily releasably connected to said link members at a point intermediate the points of pivotation of said link members with said first-mentioned members.

2. Means for releasably supporting in compression a load, said means comprising a support, a pair of link members having their adjoining ends pivotally connected and having their outer ends adapted to be pivotally connected between the load and the point of reaction, a brace member pivotally connected to said support and adapted to be releasably connected to said members to hold same in an extended position with the point of pivotation therebetween being on the far side of the dead-center position thereof with respect to said support, said brace having a cam surface at the point of connection of said brace with said members so that upon releasing action of said brace said link members are actuated by said cam from said extended position across said dead-center position and toward a collapsing position in the direction of said support.

3. A collapsible wheel chock comprising a mass-engaging member and a base member, with one end of each hingedly connected together, a pair of link members pivotally connected to said first-mentioned members at the other ends thereof and to each other to enable collapsing and extending of said first-mentioned members, a releasable brace member pivotally connected to one of said first-mentioned members and adapted to engage said link members in a position such that the pivotal connection between said link members will be held substantially on a straight line connecting the points at which said link members are connected to said mass-engaging member and said base member, and means associated with said brace member for actuating said pivotal connection between said link members from said straight-line position, along its path of collapse, upon disengagement of said brace from said link members.

4. A collapsible wheel chock comprising a mass-engaging member and a base member, with one end of each hingedly connected together, a pair of link members pivotally connected to said first-mentioned members at the other ends thereof and to each other to enable collapsing and extending of said first-mentioned members, a releasable brace member pivotally connected to one of said first-mentioned members and adapted to engage said link members in a position such that the pivotal connection between said link members will be held substantially on a straight line connecting the points at which said link members are connected to said mass-engaging member and said base member, a hook-shaped latch pivotally attached to said brace member and cooperating with said link members to secure said brace member in engagement therewith, said hook being so constructed and the point of attachment to said brace member being such, with respect to the point of connection of said brace member and said link members, in the closed position of said latch, that any releasing force applied to said brace member will urge said latch to pivot in a direction to prevent release of said brace member, and means for releasing said latch.

5. A collapsible wheel chock comprising a wheel-engaging member and a base member, said members being pivotally connected at their fore ends and having the rear ends of each connected by a pair of link members pivotally connected to said first-mentioned members and pivotally connected to each other about a common journal, a releasable brace member pivotally connected to the pivot connection at the fore ends of said first-mentioned members and having a notch adapted to engage the said common journal to which said link members are pivotally connected, said notch being located so as to hold the said journal substantially on a straight line connecting the points at which said link members are connected to said wheel-engaging member and said base member and having a cam surface in engagement with said journal so as to actuate said journal from said straight-line position along its path of collapse upon disengagement of said brace from said journal, said brace member being also provided with a hook-shaped latch pivotally attached thereto, the interior surface of said hook being adapted to engage said journal and close the open end of said notch, said latch being pivotally attached to said brace member in a position so that in the closed position of said latch, any force applied to said brace member, tending to remove the journal from said notch, will urge said latch to rotate in a direction to prevent release of said journal from said notch, and means for releasing said latch.

6. Means for releasably supporting in compression a load, said means comprising a support, a pair of link members having their adjoining ends pivotally connected and having their outer ends adapted to be pivotally connected between the load and the point of reaction, a brace member pivotally connected to said support and adapted to be releasably connected to said link members to hold same in an extended position with the point of pivotation therebetween being to one side of the dead center position thereof with respect to the points of connection to said support and load, said brace having a cam surface at the point of connection of said brace with said members so that upon releasing action of said brace, said link members are actuated by said cam from said extended position across said dead center position and in a direction of collapse.

7. A collapsible wheel chock comprising a wheel-engaging member and a base member, with one end of each pivotally connected together, a pair of link members pivotally connected to said first-mentioned members and pivotally connected to each other about a common journal, a releasable brace member pivotally connected to one of said first-mentioned members and having a notch adapted to engage the said common journal to which said link members are pivotally connected, said notch being located so as to hold the said journal substantially on a straight line connecting the points at which said link members are connected to said wheel-engaging member and said base member and having a cam surface in engagement with said journal so as to actuate said journal from said straight-line position along its path of collapse upon disengagement of said brace from said journal.

OTTO MORGENSEN, Jr.